(12) United States Patent
Nakamoto

(10) Patent No.: US 6,407,845 B2
(45) Date of Patent: Jun. 18, 2002

(54) OPTICAL TRANSMITTER AND OPTICAL TRANSMISSION SYSTEM

(75) Inventor: Hiroshi Nakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/789,510

(22) Filed: Feb. 22, 2001

(30) Foreign Application Priority Data

Jul. 11, 2000 (JP) ........................................ 2000-210489

(51) Int. Cl.⁷ ............................. G02F 1/01; H04B 10/04
(52) U.S. Cl. ..................... 359/239; 359/180; 359/187
(58) Field of Search ................................. 359/238, 239, 359/181, 182, 187

(56) References Cited

U.S. PATENT DOCUMENTS

| | | | |
|---|---|---|---|
| 5,543,952 A | * | 8/1996 | Yonenaga et al. ........... 359/181 |
| 5,805,321 A | * | 9/1998 | Ool et al. .................... 359/135 |
| 5,926,297 A | * | 7/1999 | Ishikawa et al. ............. 359/115 |
| 2002/0005975 A1 | * | 1/2002 | Nakamoto .................... 359/254 |

FOREIGN PATENT DOCUMENTS

| | | |
|---|---|---|
| EP | 0444688 A2 | 9/1991 |
| GB | 2 174 505 A | 11/1986 |
| JP | 03-251815 | 11/1991 |
| JP | 07-007206 | 1/1995 |
| JP | 09-080363 | 3/1997 |
| JP | 09236781 A * | 9/1997 ............. G02F/1/01 |

* cited by examiner

Primary Examiner—Georgia Epps
Assistant Examiner—David N. Spector
(74) Attorney, Agent, or Firm—Staas & Halsey LLP

(57) ABSTRACT

The present invention aims at providing an optical transmitter utilizing a Mach-Zehnder type optical modulator, in which the optical modulator is capable of readily optimizing an optical wavelength chirp to be added to a transmission optical signal. To this end, the optical transmitter of the present invention includes a Mach-Zehnder type optical modulator having two arms driven by two drive signals, respectively, and is constituted to comprise: amplitude adjusting parts for adjusting the amplitudes of the drive signals, respectively; phase adjusting parts for adjusting the phases of the drive signals, respectively; an amplitude controlling part for feedback controlling the amplitude adjusting parts so that an amplitude ratio between the drive signals becomes a value corresponding to an optimum optical wavelength chirp amount; and a phase controlling part for feedback controlling the phase adjusting parts so that the phases of the drive signals are brought into an antiphase relation.

9 Claims, 13 Drawing Sheets

OPTICAL TRANSMITTER AND OPTICAL TRANSMISSION SYSTEM

BACKGROUND OF THE INVENTION (1) Field of the Invention

The present invention relates to an optical transmitter utilizing an external modulator such as a Mach-Zehnder type optical modulator and an optical transmission system utilizing such an optical transmitter, and particularly to an optical transmitter and an optical transmission system for transmitting an optical signal added with a required optical wavelength chirp.

(2) Related Art

In an optical communications system having a large capacity over a long distance, it is required to reduce degradation of an optical signal when transmitting the same through a transmission path. It is known that a waveform distortion due to a self phase modulation, which is one of the degradation causes of optical signal, can be corrected at an optical transmitting terminal side by adding an optical wavelength chirp (hereinafter simply called "chirp") to the optical signal. It is also known that the optimum value of such a chirp depends on power of optical signal to be transmitted and on wavelength dispersion of a transmission path. For example, a wavelength division multiplexing (WDM) transmission system using 30 waves requires mutually different optimum chirp amounts for optical signals in 30 channels, respectively.

Known as a conventional technique for adding a chirp to an optical signal is to utilize a Mach-Zehnder type optical modulator formed of lithium niobate ($LiNbO_3$; hereinafter called "LN"), for example. There has been also proposed a technique to render a chirp amount to be variable, by driving the aforementioned type Mach-Zehnder optical modulator by two drive signals corresponding to bifurcated arms (optical waveguides), and by varying a ratio between amplitudes of the drive signals (see Japanese Unexamined Patent Publication Nos. 7-7206 and 9-80363, for example). Concretely, the chirp amount becomes 1 when the modulator is driven by setting a ratio between voltage amplitudes of the two drive signals to be 1:0 (i.e., only one of the drive signals is input), for example, and becomes 0 when the voltage amplitudes of the drive signals are equivalent to each other.

In the aforementioned conventional optical transmitters utilizing Mach-Zehnder type optical modulators, it is required to adjust the amplitudes of respective drive signals so as to optimize the chirp amount. In optimally adjusting the amplitudes of the drive signals, possible variations of time delays of respective signals require an adjustment of a phase difference between the two drive signals. However, this phase adjustment has been extremely laborious work, and difficult to practice.

SUMMARY OF THE INVENTION

The present invention has been carried out in view of the conventional problems as described above, and it is therefore an object of the present invention to provide an optical transmitter and an optical transmission system capable of readily conducting an adjustment of a chirp amount.

To achieve the object, with one aspect of an optical transmitter according to the present invention, there is provided an optical transmitter utilizing a Mach-Zehnder type optical modulator, the Mach-Zehnder type optical modulator including: a light input end for receiving light; a first arm and a second arm for branching the light from the light input end to propagate the branched light, respectively; a light output end for synthesizing the branched light propagated through the first and second arms to output the resultant light; a first electrode for applying a first drive signal to the first arm to thereby drive the first arm; and a second electrode for applying a second drive signal to the second arm to thereby drive the second arm, comprising amplitude adjusting parts for adjusting the respective amplitudes of the first and second drive signals; phase adjusting parts for adjusting the respective phases of the first and second drive signals; an amplitude controlling part for detecting the respective amplitudes of the first and second drive signals, to thereby feedback control the amplitude adjusting parts; and a phase controlling part for detecting the respective phases of the first and second drive signals, to thereby feedback control the phase adjusting parts.

In the optical transmitter having such a constitution, the light input into the light input end of the Mach-Zehnder type optical modulator is bifurcated to be propagated through the first and second arms. The respective lights propagated through the first and second arms are synthesized into a resultant light and thereafter, the resultant light is output from the light output end. This Mach-Zehnder type optical modulator is applied with the first and second drive signals to first and second electrodes, respectively, to thereby cause changes in phases of the respective lights propagated through the first and second arms, respectively, so that intensity modulations of the respective lights are conducted in accordance with the first and second drive signals, and simultaneously a chirp is added corresponding to a ratio between the amplitudes of the first and second drive signals. The amplitudes of the first and second drive signals are monitored by the amplitude controlling part, and feedback controlled by the amplitude adjusting part so that an amplitude ratio between the first and second drive signals becomes a value corresponding to the optimum value of a chirp amount. Further, the phases of the first and second drive signals are monitored by the phase controlling part and feedback controlled by the phase adjusting part so that these phases are brought into, for example, an antiphase relation and, then, the first and second drive signals are applied to the first and second electrodes, respectively. In this way, there can be realized an optical transmitter capable of readily optimizing the chirp to be added to an optical signal.

As a concrete constitution of the optical transmitter, the amplitude controlling part may detect the respective amplitudes of the first and second drive signals after propagated through the first and second electrodes, respectively, and the phase controlling part may detect the respective phases of the first and second drive signals after propagated through the first and second electrodes, respectively. Alternatively, the amplitude controlling part may detect the respective amplitudes of the first and second drive signals before being applied to the first and second electrodes, respectively, and the phase controlling part may detect the respective phases of the first and second drive signals before being applied to the first and second electrodes, respectively.

Further, when the optical transmitter comprises: low frequency signal superimposing parts, each of which superimposes a predetermined low frequency signal symmetrically on a "1" side and a "0" side of each of the first and second drive signals; and a drift controlling part for detecting a low frequency signal component included in the optical signal output from the Mach-Zehnder type optical modulator to thereby judge an occurring state of an operating point drift, and for controlling the operating point of the Mach-Zehnder type optical modulator so that the operating point drift is compensated for, it is preferable that the amplitudes of the low frequency signals superimposed on the first and second drive signals, respectively, are varied corresponding to an amplitude ratio corresponding to an optical wavelength chirp amount.

According to such a constitution, the amplitude of each low frequency signal to be superimposed on both sides of each of the first and second drive signals in order to detect the operating point drift is adjusted in accordance with the amplitude ratio corresponding to the optimum chirp amount, together with an amplitude of a main signal. In this way, in the sum signal of the first and second drive signals, a superimposition ratio of the low frequency signals becomes constant. Thus, even if the amplitude ratio between the first and second drive signals is changed when the setting of the chirp amount is changed, the low frequency signals to be detected at the drift controlling part becomes constant. As a result, even when the chirp amount is controlled by adjusting the amplitude ratio between the first and second drive signals, no affection is imposed on the detection and control of the operating point drift based on the superimposition of the low frequency signals.

Further, when the optical transmitter comprises: low frequency signal superimposing parts, each of which superimposes a predetermined low frequency signal on either one of a "1" side and a "0" side of each of the first and second drive signals; and a drift controlling part for detecting a low frequency signal component included in the optical signal output from the Mach-Zehnder type optical modulator to thereby judge an occurring state of an operating point drift, and for controlling the operating point of the Mach-Zehnder type optical modulator so that the operating point drift is compensated for; it is preferable that the amplitudes of the low frequency signals superimposed on the first and second drive signals, respectively, are kept constant independently of an amplitude ratio corresponding to an optical wavelength chirp amount.

According to such a constitution, the low frequency signals having constant amplitudes independent of the chirp amount setting are superimposed on one sides of the first and second drive signals, respectively. In this way, in the sum signal of the first and second drive signals, a superimposition ratio of the low frequency signals becomes constant. Thus, even if the amplitude ratio between the first and second drive signals is changed when the setting of the chirp amount is changed, the low frequency signals to be detected at the drift controlling part becomes constant. As a result, no affection is imposed on the detection and control of the operating point drift.

Further, in the optical transmitter, the Mach-Zehnder type optical modulator may include a light modulating part, which is connected serially to a preceding stage of the light input end or a latter stage of the light output end, so as to modulate the light input into the optical transmitter in a two staged manner.

In the optical transmitter having such a constitution, the optical signal input into the Mach-Zehnder type optical modulator is modulated by being propagated through the light input end, first and second arms, and light output end, and further modulated at the light modulating part. The optical signal as modulated in such a two staged manner is added with a chirp controlled to the optimum value at the time of the former light modulation, similarly to the aforementioned case. In this way, it becomes possible to transmit such as a high-speed optical signal in an RZ data format, and to readily adjust the optimum chirp amount.

With another aspect of the present invention, there is provided an optical transmitter utilizing an external modulator made up by serially connecting a Mach-Zehnder type optical modulator and an optical phase modulator, comprising: an amplitude adjusting part for adjusting an amplitude of a drive signal for driving the optical phase modulator; a phase adjusting part for adjusting a phase of the drive signal; an amplitude controlling part for detecting the amplitude of the drive signal and for feedback controlling the amplitude adjusting part so that the amplitude of the drive signal becomes a value corresponding to an optical wavelength chirp amount set to reduce transmittal degradation of an optical signal; and a phase controlling part for detecting the phase of the drive signal and for feedback controlling the phase adjusting part so that the phase is matched with a phase of a signal for driving the Mach-Zehnder type optical modulator. The external modulator may include a polarization scrambler instead of the optical phase modulator.

In the optical transmitter of such a constitution, the light input into the external modulator is intensity modulated at the Mach-Zehnder type optical modulator and phase modulated at the optical phase modulator, to thereby be added with the chirp. Since the chirp amount to be added to the optical signal at this time is varied corresponding to the amplitude of the drive signal for the phase modulation, the amplitude adjusting part is feedback controlled so that the amplitude of the drive signal monitored at the amplitude controlling part becomes a value corresponding to the optimum value of the chirp amount. Further, since the phase of the amplitude-adjusted drive signal is required to be matched with the phase of the drive signal for driving the Mach-Zehnder type optical modulator, the phase adjusting part is feedback controlled in accordance with the phase of the drive signal monitored by the phase controlling part. In this way, it becomes possible to conduct the adjustment of the optimum chirp amount, even in a constitution utilizing an external modulator made up by combining a Mach-Zehnder type optical modulator with an optical phase modulator.

The optical transmission system according to the present invention comprises: a plurality of optical transmitters for transmitting optical signals of different wavelengths, an optical multiplexer for multiplexing the optical signals from the optical transmitters to transmit the multiplexed optical signal to a transmission path; and an optical demultiplexer for demultiplexing the optical signal transmitted through the transmission path into optical signals of respective wavelengths; and a plurality of optical receivers for receiving and processing the optical signals of respective wavelengths demultiplexed by the optical demultiplexer; wherein the aforementioned optical transmitter according to the present invention is adopted as each of the plurality of optical transmitters; and in each of the plurality of optical transmitters, the setting of the optical wavelength chirp amount is adjusted based on receipt information transmitted from each of the optical receivers corresponding to the applicable wavelength of the applicable optical transmitter and corresponding to the wavelengths adjacent to the applicable wavelength.

According to the optical transmission system having such a constitution, the chirp amount to be added to the optical signal of each wavelength is adjusted to become the optimum value at each optical transmitter, while taking account of an influence on the adjacent wavelengths. In this way, the optimization of the chirp amount for the optical signal of each wavelength can be readily conducted, to thereby allow acquisition of an excellent transmission characteristic.

Other objects, features and advantages of the present invention will become more apparent from the following description of preferred embodiments when read in conjunction with the accompanying drawings.

DETAILED DESCRIPTION OF THE INVENTION

There will be described hereinafter embodiments according the present invention, with reference to the accompanying drawings.

Figure 1:
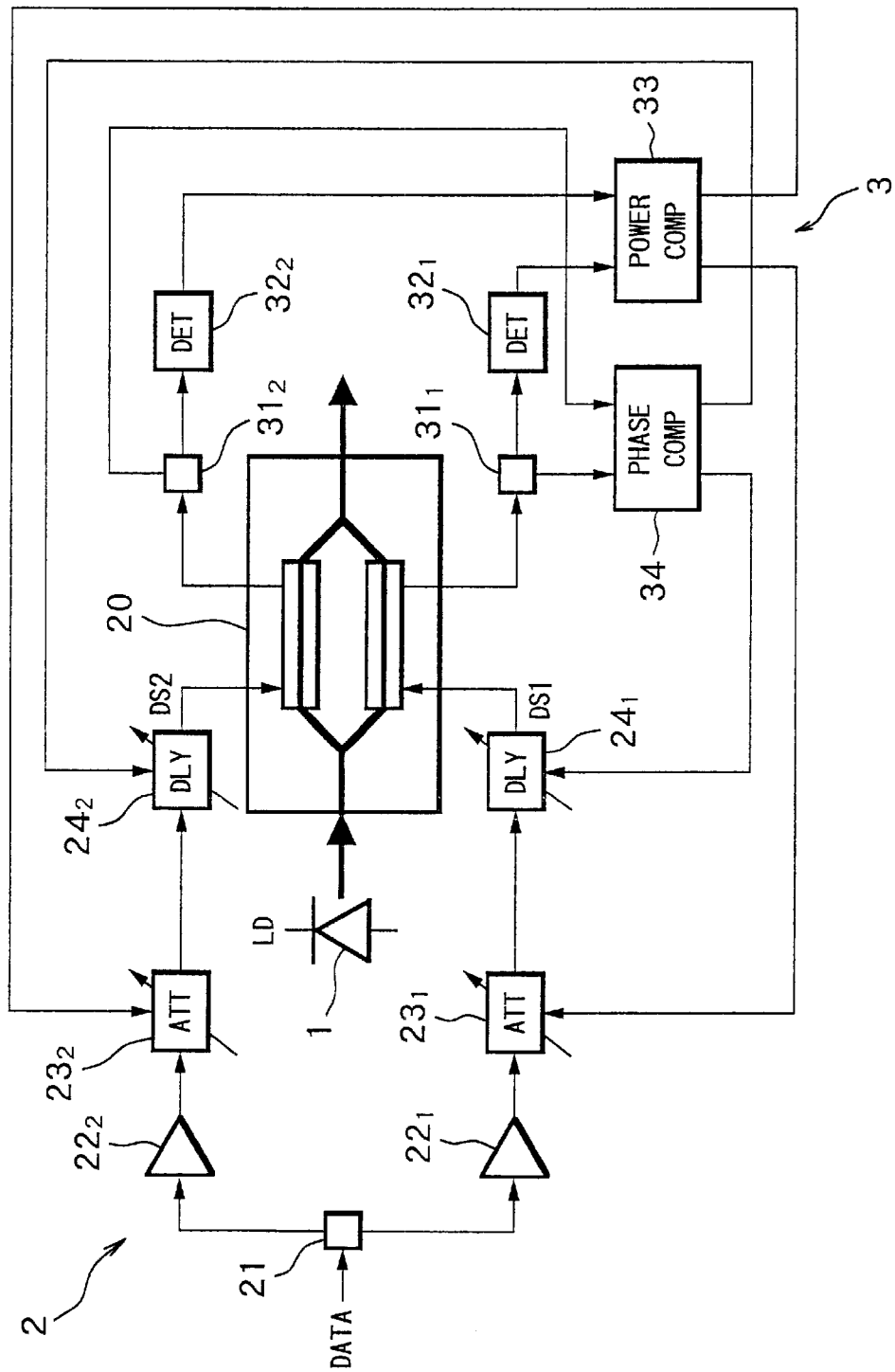
FIG. 1 is a block diagram showing an essential constitution of an optical transmitter according to a first embodiment of the present invention.

FIG. 1 is a block diagram showing an essential constitution of an optical transmitter according to a first embodiment of the present invention.

In FIG. 1, the present optical transmitter comprises a light source (LD) 1, a Mach-Zehnder type optical modulator 2 for externally modulating the light from the light source 1, and a chirp controlling circuit 3 for controlling a chirp to be added to an optical signal modulated by the Mach-Zehnder type optical modulator 2.

The light source 1 is a typical one for generating light of a required wavelength band such as by using a laser diode. The light generated by the light source 1 is kept in a predetermined polarized state such that a modulation efficiency at the Mach-Zehnder type optical modulator 2 is maximized and transmitted to a light input end 20A of the Mach-Zehnder type optical modulator 2.

The Mach-Zehnder type optical modulator 2 includes, for example, a substrate part 20, a branch circuit 21, driving circuits $22_1$, $22_2$, variable attenuators (ATT) $23_1$, $23_2$ as amplitude adjusting parts; and variable delay circuits (DLY) $24_1$, $24_2$ as phase adjusting parts.

Figure 2:
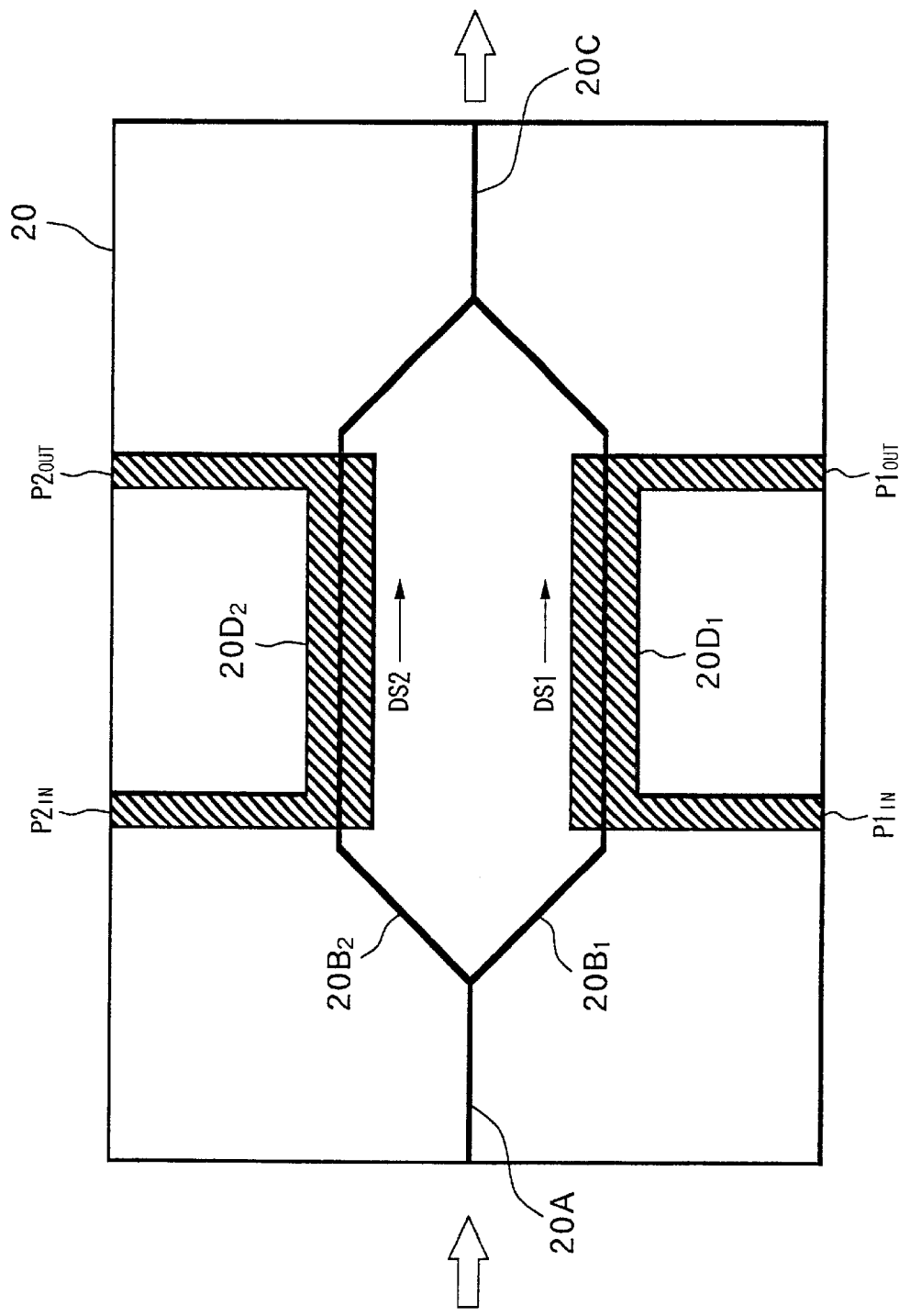
FIG. 2 is an enlarged plan view of a substrate part utilized in the first embodiment.

In the substrate part 20 as shown in an enlarged plan view of FIG. 2, continuous-wave (CW) light from the light source 1 is input into a light input end 20A, and, thereafter bifurcated to be propagated through a first arm $20B_1$, and a second arm $20B_2$, respectively, and then multiplexed into a resultant light. This resultant light is output to the exterior via a light output end 20C. Formed on the first arm $20B_1$ and second arm $20B_2$ are a first electrode $20D_1$ and a second electrode $20D_2$ in approximately channel shapes, respectively, and these electrodes $20D_1$, $20D_2$ are applied with a first drive signal DS1 and a second drive signal DS2 which are usually in opposite phase to each other, respectively, to be described later. Here, the first drive signal DS1 is input into an input terminal $P1_{IN}$ positioned at the light input end 20A side of the first electrode $20D_1$, advances on the first arm $20B_1$, and is output from an output terminal $P1_{OUT}$ positioned at the light output end 20C side. Further, the second drive signal DS2 is input into an input terminal $P2_{IN}$ positioned at the light input end 20A side of the second electrode $20D_2$, advances on the second arm $20B_2$, and is output from an output terminal $P2_{OUT}$ positioned at the light output end 20C side. Although not shown, there may be formed an earth electrode so as to enclose the first and second electrodes $20D_1$, $20D_2$. Further, the electrodes $20D_1$, $20D_2$ shall be applied with required DC voltages, respectively, in addition to the drive signals DS1, DS2.

The branch circuit 21 bifurcates a data signal DATA transmitted at a required bit rate, and sends the bifurcated signals to driving circuits $22_1$, $22_2$, respectively. The bit rate of this data signal can be arbitrarily set, for example, at a higher one exceeding 10 Gbit/s.

The driving circuits $22_1$, $22_2$ generate signals as origins of the drive signals DS1, DS2, respectively, such as by amplifying the bifurcated data signals from the branch circuit 21 to predetermined levels, respectively. Note, the signal to be generated by the driving circuit $22_1$ and the signal to be generated by the driving circuit $22_2$ are kept in a phase relation opposite to each other, and the drive signals DS1, DS2 operating in a push-pull manner shall be input to the substrate part 20.

The variable attenuators $23_1$, $23_2$ attenuate the respective signals output from the driving circuits $22_1$, $22_2$, respectively, so that a ratio between the amplitudes of respective signals output from the driving circuits $22_1$, $22_2$ becomes a value corresponding to a required chirp amount. Amounts attenuated by the variable attenuators $23_1$, $23_2$ are controlled by control signals output from an electric power comparison circuit 33 to be described later.

The variable delay circuits $24_1$, $24_2$ are provided to delay the signals output from the variable attenuators $23_1$, $23_2$, respectively, to thereby adjust phases of the signals, respectively. Delay amounts by the variable delay circuits $24_1$, $24_2$ are controlled in accordance with control signals output by a phase comparison circuit 34 to be described later, so that phases of the signals are brought into an antiphase relation.

The chirp controlling circuit 3 includes, for example, branch circuits $31_1$, $31_2$, electric power detectors (DET's)

$32_1$, $32_2$, the electric power comparison circuit (POWER COMP) 33, and the phase comparison circuit (PHASE COMP) 34. Here, the electric power detectors $32_1$, $32_2$ and electric power comparison circuit 33 cooperatively function as an amplitude controlling part, while the phase comparison circuit 34 functions as a phase controlling part.

The branch circuits $31_1$, $31_2$ bifurcate the first and second drive signals DS1, DS2 output from the output terminals $P1_{OUT}$, $P2_{OUT}$ of the substrate part 20, respectively. One of the first drive signals DS1 bifurcated by the branch circuit $31_1$ is transmitted to the electric power detector $32_1$, and one of the second drive signals DS2 bifurcated by the branch circuit $31_2$ is transmitted to the electric power detector $32_2$. Both of the others of the first and second drive signals bifurcated by the branch circuits $31_1$, $31_2$, respectively, are transmitted to the phase comparison circuit 34.

The electric power detectors $32_1$, $32_2$ detect electric powers of the first and second drive signals DS1, DS2 bifurcated by the branch circuits $31_1$, $31_2$, respectively, and output the respective detection results to the electric power comparison circuit 33.

The electric power comparison circuit 33 compares values of the electric powers detected by the electric power detectors $32_1$, $32_2$ so as to obtain a ratio between the amplitudes of the first and second drive signals, and generates control signals for feedback controlling the attenuation amounts of the variable attenuators $23_1$, $23_2$, respectively, so that this ratio becomes a value corresponding to the optimum value of a chirp amount.

The phase comparison circuit 34 compares the phases the first and second drive signals DS1, DS2 bifurcated by the branch circuits $31_1$, $31_2$, respectively, with each other, and generates control signals for feedback controlling the delay amounts of the variable delay circuits $24_1$, $24_2$, respectively, so that the phases of the drive signals are brought into an antiphase relation.

There will be described an operation of the first embodiment.

In the present optical transmitter, CW light generated by the light source 1 is externally modulated by the Mach-Zehnder type optical modulator 2. This Mach-Zehnder type optical modulator 2 is applied with the first and second drive signals DS1, DS2 to the electrodes $20D_1$, $20D_2$ to thereby cause changes in the phases of respective lights propagated through the first and second arms $20B_1$, $20B_2$, respectively. A phase difference between the respective lights becomes 0 or π, resulted in an ON or OFF state of the light to be output from the light output end 20C. In this way, there is conducted an intensity modulation corresponding to the first and second drive signals DS1, DS2.

In the light modulation utilizing the Mach-Zehnder type optical modulator 2, there is essentially caused a wavelength change. Concretely, in one optical pulse modulated by the Mach-Zehnder type optical modulator 2, there is generated such a phenomenon called a red shift in which the wavelength shifts from a short wavelength (blue side) to a long wavelength (red side) with time lapse, or a phenomenon called blue shift in which the wavelength shifts from a long wavelength (red side) to a short wavelength (blue side) with time lapse. In the present optical transmitter, there is added a chirp to transmission light making use of the aforementioned wavelength change.

To add a required amount of chirp to an optical signal at the Mach-Zehnder type optical modulator 2, it is necessary to suitably adjust an amplitude ratio and the phase relation between the first and second drive signals. The amplitude ratio between the first and second drive signals shall be firstly considered. For example, when a required chirp amount is α, if the optimum driving voltage is set as Vπ assuming that the Mach-Zehnder type optical modulator 2 is to be driven by only one of the driving electrodes, a voltage V1 of the first drive signal and a voltage V2 of the second drive signal can be represented as follows:

$$V1=(1+\alpha)\cdot V\pi/2,$$

and $$V2=(1-\alpha)\cdot V\pi/2.$$

Thus, the amplitude ratio between the first and second drive signals is determined corresponding to the optimum value of the chirp amount α to be set depending on power of the optical signal to be transmitted and on wavelength dispersion of a transmission path. In this embodiment, the aforementioned amplitude ratio corresponding to the optimum value of the chirp amount α is previously set in the electric power comparison circuit 33, and the amplitudes (voltages) of the first and second drive signals are feedback controlled by adjusting the attenuation amounts of the variable attenuators $23_1$, $23_2$ so that the optimum chirp amount is added to the optical signal. Note, in feedback controlling these amplitudes, there shall be simultaneously conducted at the electric power comparison circuit 33 such a control that a sum of electric powers detected by the electric power detectors $32_1$, $32_2$ becomes a value corresponding to the optimum driving voltage Vπ in case of driving by only one of the electrodes as described above.

Further, the phase relation between the first and second drive signals is adjusted such that the phases of the first and second drive signals DS1, DS2 advancing through the electrodes $20D_1$, $20D_2$, respectively, are brought into an antiphase relation. Here, the phases of the first and second drive signals DS1, DS2 output from the output terminals $P1_{OUT}$, $P2_{OUT}$ of the electrodes $20D_1$, $20D_2$ are compared with each other by the phase comparison circuit 34, and the phases of the first and second drive signals are feedback controlled by adjusting the delay amounts of the variable delay circuits $24_1$, $24_2$ so as to keep the antiphase relation.

Concretely, for example, the delay amounts of the variable delay circuits $24_1$, $24_2$ may be adjusted so as to obtain a computation result corresponding to 1 (one) time slot of a data signal, by computing a logical product of both drive signals after logically inverting one of the two drive signals to be input into the phase comparison circuit 34. As a concrete setting condition of this phase control, it is preferable to conduct feedback controlling so that the phases of the first and second drive signals DS1, DS2 are brought into an antiphase relation within a range less than 10% for 1 time slot of data.

According to the first embodiment as described above, the amplitudes and phases of the first and second drive signals DS1, DS2 are monitored and feedback controlled, to thereby enable realization of the optical transmitter capable of readily adjusting the chirp amount to the optimum value.

There will be now described a modified example of the first embodiment.

Figure 3:
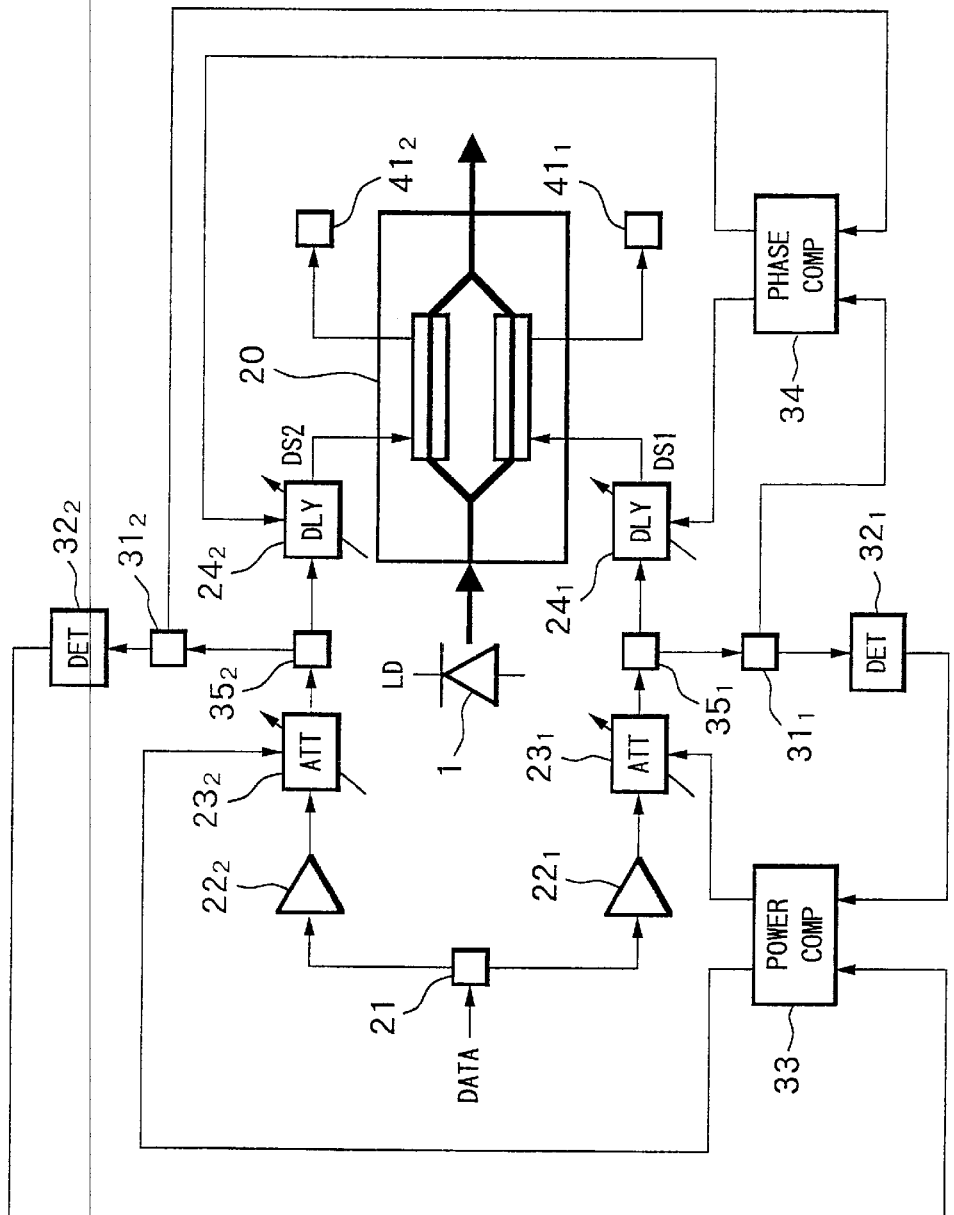
FIG. 3 is a block diagram showing an essential constitution of an optical transmitter according to a modified example of the first embodiment.

FIG. 3 is a block diagram showing an essential constitution of an optical transmitter according to a modified example of the first embodiment. Like reference numerals as used in FIG. 1 are used to denote identical elements in FIG. 3, and the same rule applies corresponding to the following.

In FIG. 3, the constitution of this optical transmitter is different from that of the first embodiment shown in FIG. 1, in that: branch circuits $35_1$, $35_2$ for monitoring the first and second drive signals DS1, DS2 are inserted, for example, between the variable attenuators $23_1$, $23_2$ and between the variable delay circuits $24_1$, $24_2$, respectively; and instead of the first and second drive signals DS1, DS2 output from the output terminals $P1_{OUT}$, $P2_{OUT}$, respectively, of the Mach-Zehnder type optical modulator 2, first and second drive signals DS1, DS2 bifurcated by the branch circuits $35_1$, $35_2$ are input into the branch circuits $31_1$, $31_2$, respectively. Note, terminators $41_1$, $41_2$ are connected to the output terminals $P1_{OUT}$, $P2_{OUT}$ of the Mach-Zehnder type optical modulator 2, respectively. The remaining constitution other than the above is identical with that of the first embodiment.

In this way, the optical transmitter according to the present invention is not limited to such a constitution that the chirp is controlled by monitoring the first and second drive signals DS1, DS2 having passed through the electrodes $20D_1$, $20D_2$ of the Mach-Zehnder type optical modulator 2, respectively. It is also possible to control the chirp by monitoring the first and second drive signals DS1, DS2 before input into the electrodes $20D_1$, $20D_2$, respectively.

In this modified example, the branch circuits $35_1$, $35_2$ for monitoring the first and second drive signals DS1, DS2 have been inserted between the variable attenuators $23_1$, $23_2$ and between the variable delay circuits $24_1$, $24_2$, respectively. However, it is also possible to insert these branch circuits $35_1$, $35_2$ between the variable delay circuits $24_1$, $24_2$ and the input terminals $P1_{IN}$, $P2_{IN}$ of the Mach-Zehnder type optical modulator 2, respectively.

There will be described hereinafter a second embodiment of the present invention.

In this second embodiment, there will be considered a situation where the present invention is applied to an optical transmitter having a function to compensate for an operating point drift of a Mach-Zehnder type optical modulator. Note, the "operating point drift" of a Mach-Zehnder type optical modulator means a phenomenon in which a fluctuation is caused in input and output characteristics of a Mach-Zehnder type optical modulator such as due to a DC voltage to be applied to the modulator, a temperature change, and a change with time lapse.

Figure 4:
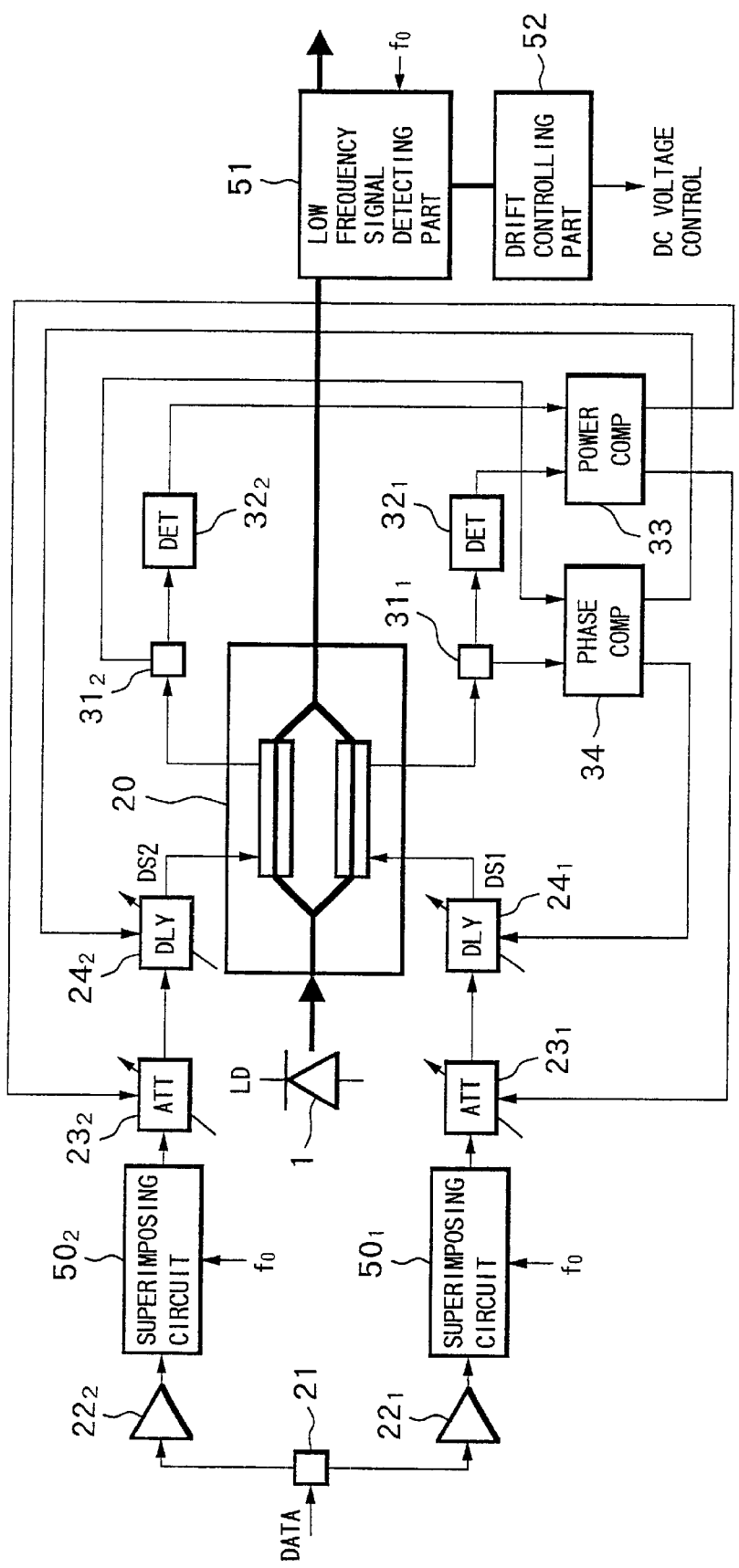
FIG. 4 is a block diagram showing an essential constitution of an optical transmitter according to a second embodiment of the present invention.

FIG. 4 is a block diagram showing an essential constitution of an optical transmitter according to the second embodiment of the present invention.

In FIG. 4, the present optical transmitter is provided with, in addition to the constitution of the first embodiment shown in FIG. 1: superimposing circuits $50_1$, $50_2$ as low frequency signal superimposing parts for superimposing low frequency signals of a frequency $f_0$ on the first and second drive signals DS1, DS2, respectively; a low frequency signal detecting part 51 for detecting a low frequency signal component included in the optical signal output from the Mach-Zehnder type optical modulator 2, and for comparing a phase of the detected low frequency signal component with a phase of the low frequency signal before superimposition, to thereby detect an operating point drift direction; and a drift controlling part 52 for controlling the operating point of the Mach-Zehnder type optical modulator 2 into the same direction as the operating point drift direction detected by the low frequency signal detecting part 51, according to this drift direction. The thus described constitution for compensating for the operating point drift of the Mach-Zehnder type optical modulator 2 is the same as a known constitution such as described in Japanese Unexamined Patent Publication No. 3-251815. The constitution of this embodiment is characterized by such a countermeasure that the control of the amplitude ratio between the first and second drive signals corresponding to the optimum chirp amount never affects on the detection and control of the operating point drift using a low frequency signal.

Each of the superimposing circuits $50_1$, $50_2$ superimposes a predetermined low frequency signal output from a low frequency oscillator (not shown), symmetrically on a "1" side and a "0" side of a high-speed main signal output from the pertinent one of the driving circuits $22_1$, $22_2$ (to thereby amplitude modulates the main signal), and outputs the main signal superimposed with the low frequency signal to the pertinent one of the variable attenuators $23_1$, $23_2$.

The low frequency signal detecting part 51 branches a portion of the optical signal output from the Mach-Zehnder type optical modulator 2, for example, converts the thus branched light into an electrical signal, and extracts therefrom a frequency $f_0$ component signal. The low frequency signal detecting part 51 further compares a phase of the extracted frequency $f_0$ component signal with that of the low frequency signal from the low frequency oscillator, and outputs a signal corresponding to a difference between those phases to the drift controlling part 52.

The drift controlling part 52 controls values of DC voltages to be applied to the electrodes $20D_1$, $20D_2$ of the Mach-Zehnder type optical modulator 2, respectively, according to the signal of the low frequency signal detecting part 51.

Since the concrete circuit constitutions of the aforementioned low frequency signal detecting part 51 and drift controlling part 52 are disclosed in detail in the aforementioned Japanese Unexamined Patent Publication No. 3-251815, the explanation thereof shall be omitted herein.

In the optical transmitter having the aforementioned constitution, the low frequency signal is symmetrically superimposed on the "1" side and "0" side of each of the high-speed main signals output from the driving circuits $22_1$, $22_2$, respectively. Each of the main signals superimposed with the low frequency signal is: attenuated by the pertinent one of the variable attenuators $23_1$, $23_2$ so that an amplitude ratio between the main signals corresponds to the optimum chirp amount; delayed by the pertinent one of the variable delay circuits $24_1$, $24_2$ so that the phases of the main signals are brought into an antiphase relation; and input into the pertinent one of the electrodes $20D_1$, $20D_2$ of the Mach-Zehnder type optical modulator 2.

FIG. 5 is a view showing exemplary waveforms of drive signals input into the Mach-Zehnder type optical modulator 2, in which 5A shows a waveform of the first drive signal DS1 to be input into the input terminal $P1_{IN}$, 5B shows a waveform of the second drive signal DS2 to be input into the input terminal $P2_{IN}$, and 5C shows a waveform corresponding to a sum of the first and second drive signals DS1, DS2.

Figure 5A:
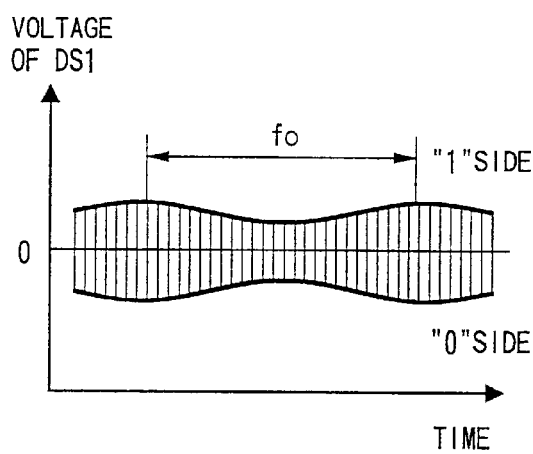
FIG. 5 is a view showing exemplary waveforms of drive signals input into a Mach-Zehnder type optical modulator in the second embodiment, in which 5A, 5B and 5C show waveforms of a first drive signal, a second drive signal, and a sum of the first and second drive signals, respectively.
Figure 5B:
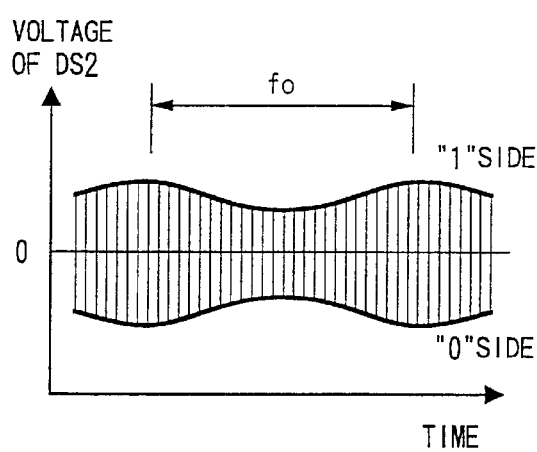
Figure 5C:
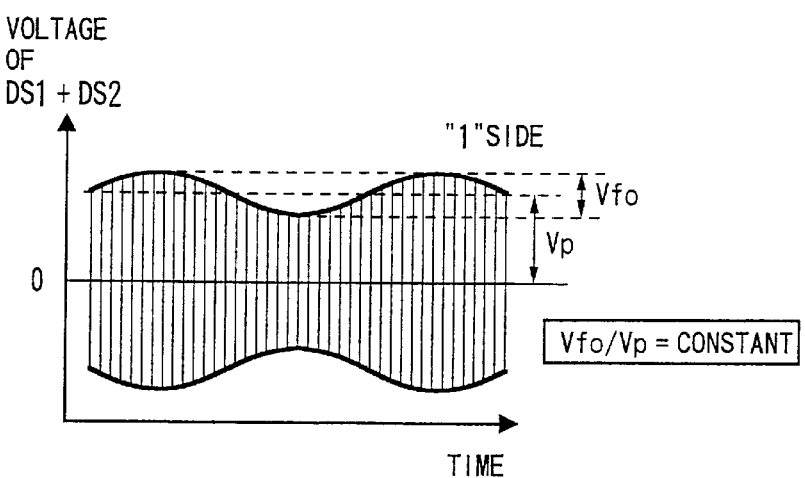

As shown in FIG. 5A and FIG. 5B, each of the first and second drive signals DS1, DS2 is superimposed with the low frequency signal of the frequency $f_0$ at the "1" side and "0" side, and the overall amplitude of each of the first and second drive signals DS1, DS2, including the superimposed component, is controlled according to the amplitude ratio corresponding to the optimum chirp amount. This means that the amplitude of the low frequency signal to be superimposed on the drive signals so as to detect the operating point drift is adjusted in accordance with the amplitude ratio corresponding to the optimum chirp amount, simultaneously with the adjustment of the amplitudes of the high-speed main signals. When such first and second drive signals DS1, DS2 are input into the electrodes $20D_1$, $20D_2$, respectively, the light is modulated in accordance with a signal corresponding to the sum of the first and second drive signals DS1, DS2 as shown in FIG. 5C. In this sum signal of the first and second drive signals DS1, DS2, a superimposition ratio of the summed low frequency signals becomes constant ($Vf_0/V_p$=constant in FIG. 5C). Thus, even when the amplitude ratio between the first and second drive signals DS1, DS2 is varied by varying the setting of the optimum chirp amount, the low frequency signal to be detected by the low frequency signal detecting part 51 becomes constant. As a result, even when the chirp amount is controlled by adjusting the amplitude ratio between the first and second drive signals, no affection is imposed on the detection and control of the operating point drift based on the superimposition of the low frequency signal.

In this way, according to the second embodiment, when the low frequency signal is to be superimposed symmetrically on the "1" side and "0" side of each of the first and second drive signals DS1, DS2, the amplitude of the low frequency signal to be superimposed on each of the drive signals is also adjusted according to the amplitude ratio corresponding to the optimum chirp amount. Thus, the superimposition ratio of the summed low frequency signals in the sum signal of the first and second drive signals DS1, DS2 becomes constant, to thereby assuredly enable the detection and control of the operating point drift. This enables an easy adjustment of the optimum chirp amount, and realization of an optical transmitter capable of stably conducting an external modulation of an optical signal while compensating for the operating point drift of the optical modulator.

There will be now described a third embodiment of the present invention.

In this third embodiment, there will be considered a constitution different from the second embodiment in which the present invention has been applied to the optical transmitter provided with the function for compensating for the operating point drift of the Mach-Zehnder type optical modulator.

Figure 6:
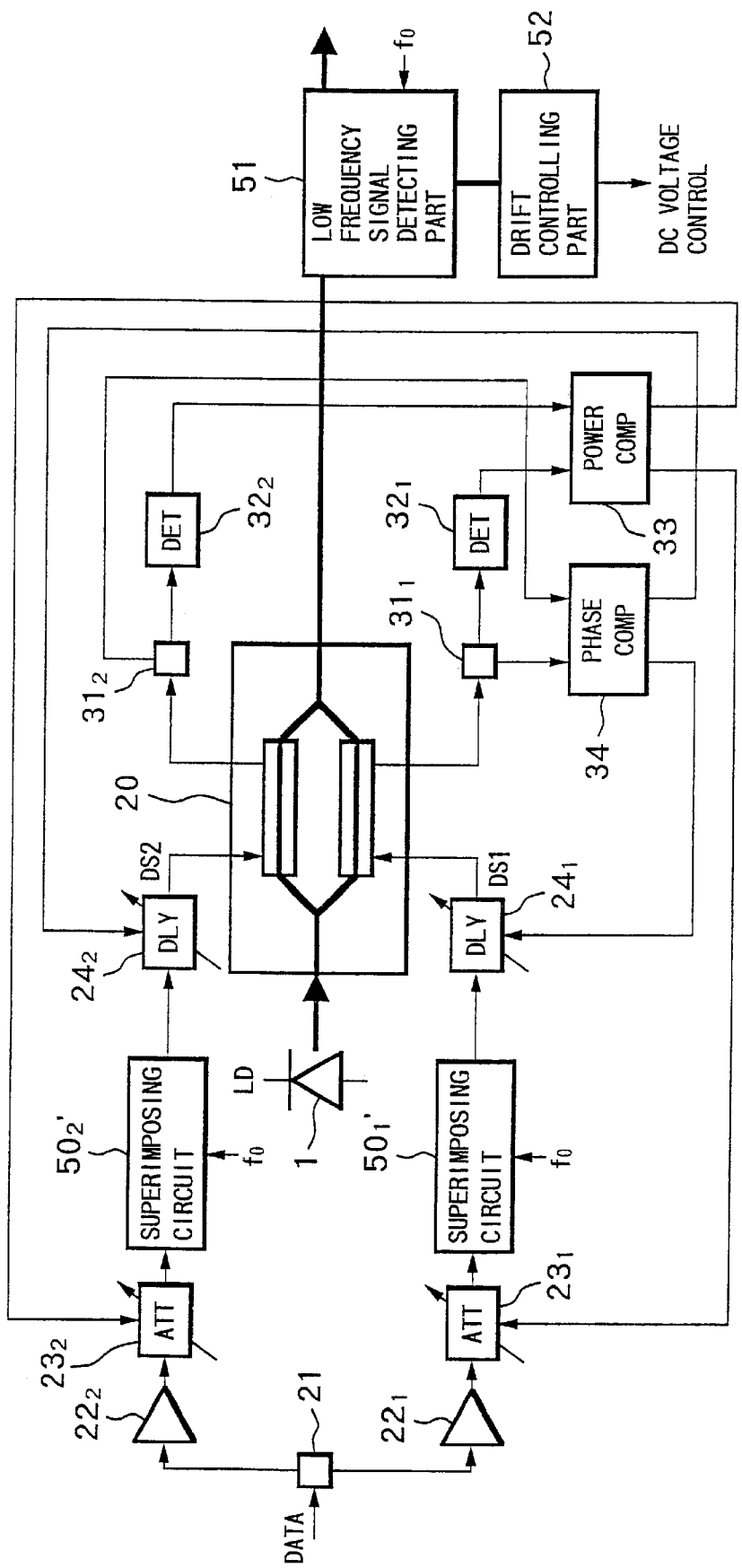
FIG. 6 is a block diagram showing an essential constitution of an optical transmitter according to a third embodiment of the present invention.

FIG. 6 is a block diagram showing an essential constitution of an optical transmitter according to the third embodiment of the present invention.

In FIG. 6, the constitution of this optical transmitter is different from that of the second embodiment shown in FIG. 4, in that: instead of the superimposing circuits $50_1$, $50_2$ used in the second embodiment, superimposing circuits $50_1'$, $50_2'$ for superimposing the low frequency signal on either one of the "1" side and "0" side of the pertinent one of the first and second drive signals are provided between the variable attenuators $23_1$, $23_2$ and the variable delay circuits $24_1$, $24_2$, respectively. The remaining constitution other than the above is identical with that of the second embodiment.

In the optical transmitter having the aforementioned constitution, the output signals (high-speed main signals) from the driving circuits $22_1$, $22_2$ are transmitted to the superimposing circuits $50_1'$, $50_2'$, respectively, after: attenuated by the variable attenuators $23_1$, $23_2$, respectively, so as to attain the amplitude ratio corresponding to the optimum chirp amount. At each of the superimposing circuits $50_1'$, $50_2'$, the low frequency signal of the frequency $f_0$ is superimposed on either one of the "1" side and "0" side of the pertinent one of the output signals (high-speed main signals) which have been adjusted to have the required amplitude ratio therebetween. Further, the signals superimposed with the low frequency signal are delayed by the variable delay circuits $24_1$, $24_2$, respectively, so that the phases of the signals are brought into an antiphase relation, and then input into the electrodes $20D_1$, $20D_2$ of the substrate part 20, respectively.

FIG. 7 is a view showing exemplary waveforms of drive signals input into the Mach-Zehnder type optical modulator 2, in which 7A shows a waveform of the first drive signal DS1 to be input into the input terminal $P1_{IN}$, 7B shows a waveform of the second drive signal DS2 to be input into the input terminal $P2_{IN}$, and 7C shows a waveform corresponding to a sum of the first and second drive signals DS1, DS2.

Figure 7A:
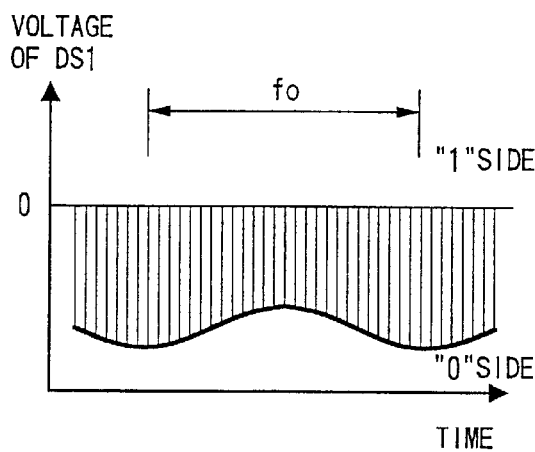
FIG. 7 is a view showing exemplary waveforms of drive signals input into a Mach-Zehnder type optical modulator in the third embodiment, in which 7A, 7B and 7C show waveforms of a first drive signal, a second drive signal, and a sum of the first and second drive signals, respectively.
Figure 7B:
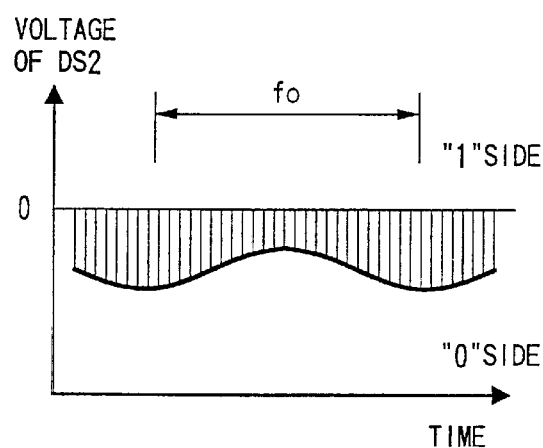
Figure 7C:
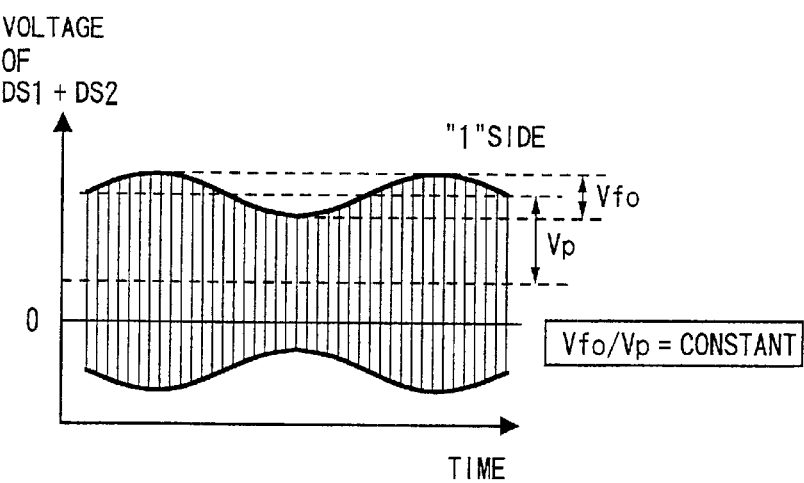

As shown in FIG. 7A and FIG. 7B, in the first and second drive signals DS1, DS2, low frequency signals having mutually identical constant amplitudes independent of the amplitude ratio between the high-speed main signal components are superimposed on the "0" sides of the amplitude-adjusted high-speed main signal components, respectively, in this situation. Input of such first and second drive signals DS1, DS2 into the electrodes $20D_1$, $20D_2$, respectively, results in a modulation of the light in accordance with the signal corresponding to the sum of the first and second drive signals DS1, DS2 as shown in FIG. 7C. It is noted in FIG. 7C that the part upper than 0V corresponds to the first drive signal DS1 (the polarity has been reversed) and the part lower than 0V corresponds to the second drive signal DS2. In this sum signal of the first and second drive signals DS1, DS2, the superimposition ratio of the low frequency signals becomes constant ($Vf_0/V_p$=constant in FIG. 7C). Thus, even when the amplitude ratio between the high-speed main signal components of the first and second drive signals DS1, DS2 is varied by varying the setting of the optimum chirp amount, the low frequency signal to be detected by the low frequency signal detecting part 51 becomes constant. As a result, even when the chirp amount is controlled by adjusting the amplitude ratio between the first and second drive signals, no affection is imposed on the detection and control of the operating point drift based on the superimposition of the low frequency signal.

In this way, according to the third embodiment, when the low frequency signal is to be superimposed on either one of the "1" side and "0" side of each of the first and second drive signals DS1, DS2, the amplitude of the low frequency signal to be superimposed on the respective drive signals is adjusted to be constant independently of the amplitude ratio corresponding to the optimum chirp amount. Thus, the superimposition ratio of the summed low frequency signals in the sum signal of the first and second drive signals DS1, DS2 becomes constant, to thereby obtain the same effect as in the second embodiment.

In the third embodiment, the superimposing circuits $50_1'$, $50_2'$ have been provided between the variable attenuators $23_1$, $23_2$ and the variable delay circuits $24_1$, $24_2$, respectively. However, the superimposing circuits $50_1'$, $50_2'$ may be provided between the variable delay circuits $24_1$, $24_2$ and the input terminals $P1_{IN}$, $P2_{IN}$ of the Mach-Zehnder type optical modulator 2, respectively.

Further, the second and third embodiments have been constituted such that the chirp is controlled by monitoring the first and second drive signals DS1, DS2 having passed through the electrodes $20D_1$, $20D_2$ of the Mach-Zehnder type optical modulator 2. However, similarly to the situation as explained in the modified example of the first embodiment, it is also possible to control the chirp by monitoring the first and second drive signals DS1, DS2 before input into the electrodes $20D_1$, $20D_2$, respectively.

There will be described hereinafter a fourth embodiment of the present invention.

In this fourth embodiment, there will be considered a situation where the present invention is applied to an optical transmitter capable of transmitting a high-speed optical signal in an RZ data format, by connecting two Mach-Zehnder type optical modulators in a serial two staged manner.

Figure 8:
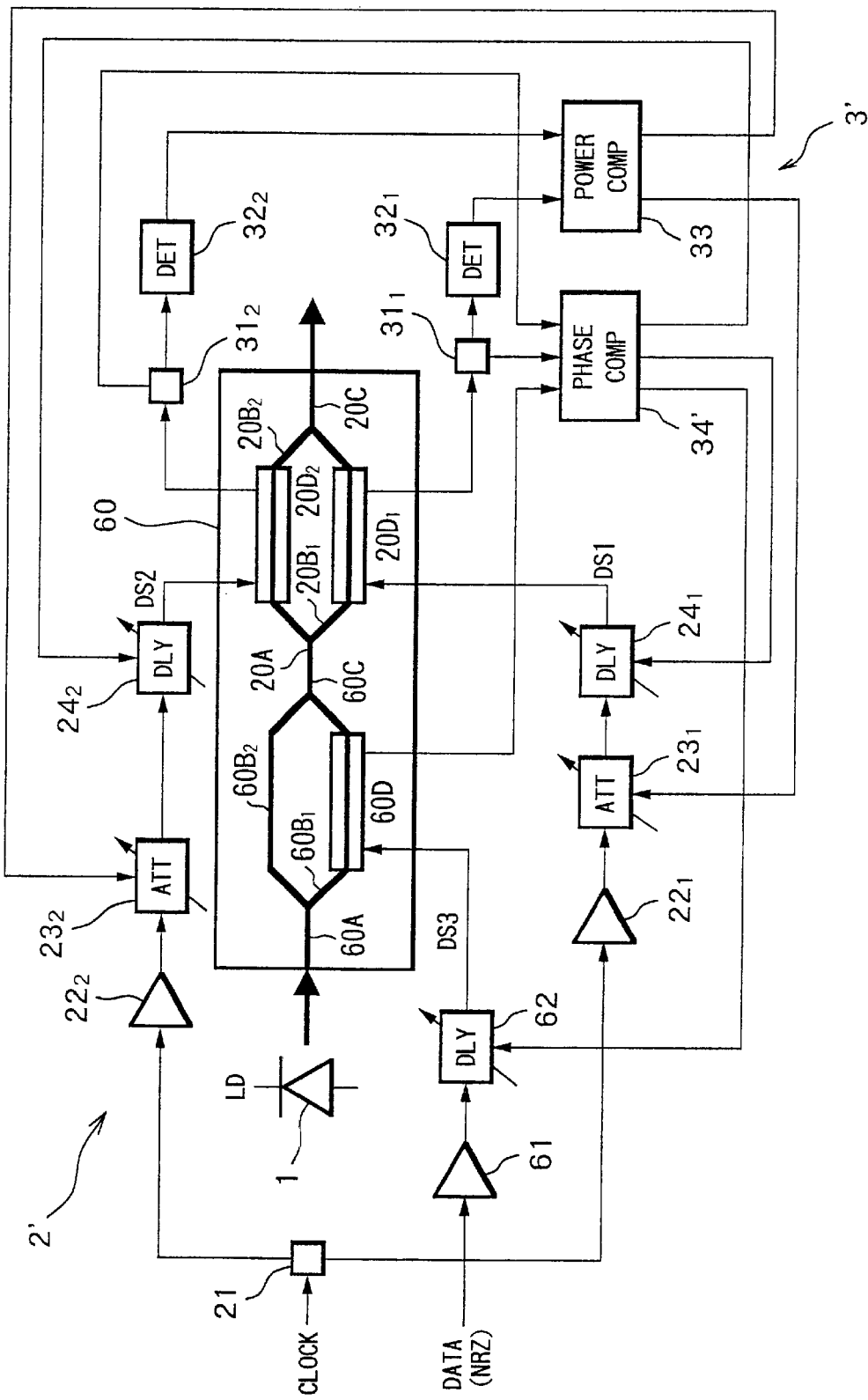
FIG. 8 is a block diagram showing an essential constitution of an optical transmitter according to a fourth embodiment of the present invention.

FIG. 8 is a block diagram showing an essential constitution of an optical transmitter according to a fourth embodiment of the present invention;

In FIG. 8, the present optical transmitter is constituted to include: a light source (LD) 1; a Mach-Zehnder type optical modulator 2' for externally modulating light from the light source 1 in a two staged manner; and a chirp controlling circuit 3' for controlling the chirp to be added to the optical signal modulated by the Mach-Zehnder type optical modulator 2'.

The constitution of the Mach-Zehnder type optical modulator 2' is different from that of the Mach-Zehnder type optical modulator 2 used in the first embodiment, in that: instead of the substrate part 20 for conducting the modulation in a single stage manner, there is adopted a substrate part 60 for conducting a modulation in a two staged manner by serially connecting a similar Mach-Zehnder type optical modulator to the preceding stage of the substrate part 60, and there are provided a driving circuit (ATT) 61 and a variable delay circuit (DLY) 62 at the preceding stage side so as to provide a drive signal. The latter stage side of the substrate part 60 is identical with the substrate part 20 of the first embodiment, and the constitution for providing the first and second drive signals DS1, DS2 to such a latter stage side is also identical with that of the first embodiment.

At the preceding stage side of the substrate part 60, the CW light from the light source 1 is input into a light input end 60A, and thereafter bifurcated to be propagated through first arm $60B_1$ and second arm $60B_2$, respectively, and then multiplexed into a resultant light to be output from a light output end 60C to the light input end 20A of the latter stage side. Formed on the first arm $60B_1$ is an electrode 60D to which a third drive signal DS3 to be described later is applied from the light input end 60A side. In such a substrate part 60 of a two-staged constitution, the CW light from the light source 1 is intensity modulated at the preceding stage side in accordance with the data signal in an NRZ format, and then intensity modulated at the latter stage side in accordance with a clock signal corresponding to the modulation at the preceding stage side, to thereby finally generate an optical signal in an RZ data format. Note, similarly to the first embodiment, the chirp amount to be added to the optical signal is controlled by adjusting the amplitude ratio between the first and second drive signals DS1, DS2 to be applied to the latter stage side.

The driving circuit 61 generates a signal as an origin of the drive signal DS3 such as by amplifying a data signal (DATA) at a required bit rate and in an NRZ format to a predetermined level, and outputs the signal to the variable delay circuit 62.

The variable delay circuit 62 is to delay the signal output from the driving circuit 61 to thereby adjust a phase of the signal. A delay amount of this variable delay circuit 62 is controlled by a control signal output from a phase comparison circuit 34' to be described later.

The constitution of the chirp controlling circuit 3' is different from that of the chirp controlling circuit 3 used in the first embodiment, in that: instead of the phase comparison circuit 34, there is provided the phase comparison circuit (PHASE COMP) 34' for comparing the phases of the first and second drive signals DS1, DS2 bifurcated by the branch circuits $31_1$, $31_2$ with a phase of the third drive signal having passed through an electrode 60D at the preceding stage side of the substrate part 60.

Figure 9:
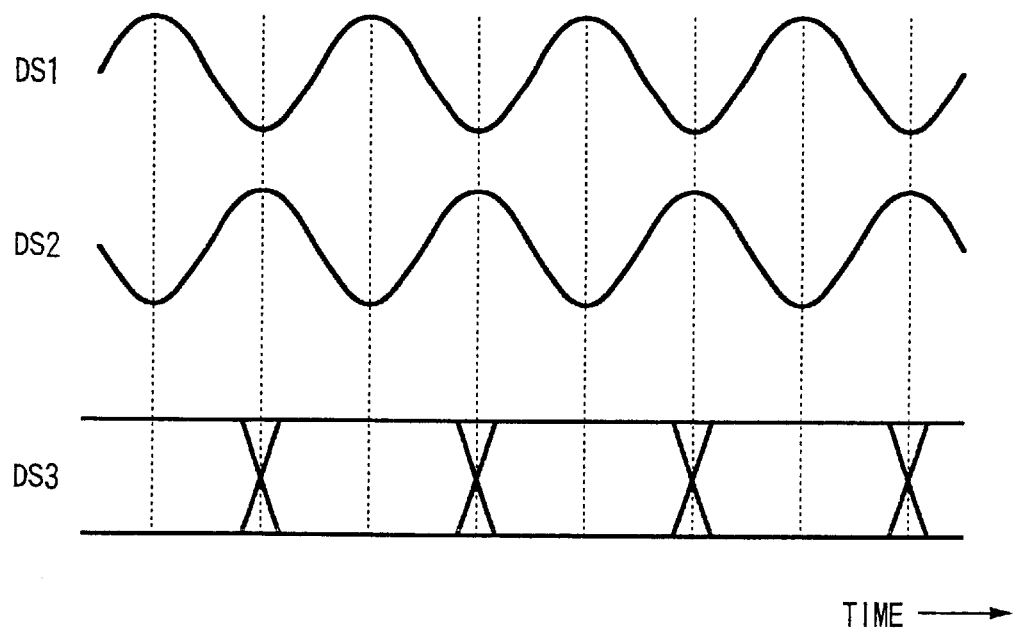
FIG. 9 is a diagram for explaining a phase relation among first, second and third drive signals in the fourth embodiment.

The phase comparison circuit 34' generates control signals for feedback controlling the respective delay amounts of the variable delay circuits $24_1$, $24_2$, 62, so that the phases of the first through third drive signals DS1, DS2, DS3 have mutual relations as shown in a waveform diagram of FIG. 9. Namely, concerning the first and second drive signals DS1, DS2, the phase comparison circuit 34' compares the phases of the first and second drive signals DS1, DS2 bifurcated by the branch circuits $31_1$, $31_2$, respectively, and feedback controls the delay amounts of the variable delay circuits $24_1$, $24_2$, respectively, so that the phases of the first and second drive signals DS1, DS2 are brought into an antiphase relation, similarly to the first embodiment. Concerning the third drive signal DS3, the phase comparison circuit 34' compares the phases of the first and second drive signals DS1, DS2 with the phase of the third drive signal having passed through the electrode 60D at the preceding stage side of the substrate part 60, and generates the control signal for feedback controlling the delay amount of the variable delay circuit 62 so that the timing, at which the first and second drive signals DS1, DS2 become the maximum or the minimum, coincides with a transitional point of the data or with a substantial center of 1 unit data length of the third drive signal DS3.

In the optical transmitter of the aforementioned constitution, the CW light generated by the light source 1 is NRZ-data modulated at the preceding stage side of the Mach-Zehnder type optical modulator 2'. At this time, although the optical signal is added with a chirp, this chirp is constant. Further, the NRZ-data modulated optical signal is further modulated in accordance with the clock signal at the latter stage side of the Mach-Zehnder type optical modulator 2', and thus converted into an RZ data format. At this time, since the electrodes $20D_1$, $20D_2$ at the latter stage side are applied with the first and second drive signals DS1, DS2 feedback controlled so that these first and second drive signals DS1, DS2 are brought into an antiphase relation with the amplitude ratio corresponding to the optimum chirp amount similarly to the first embodiment, the adjustment of the chirp amount can be readily conducted.

In this way, according to the fourth embodiment, there can be obtained the same effect as the first embodiment, by applying the present invention, for the side which conducts the modulation by simultaneously driving two arms, even in such a constitution that the Mach-Zehnder type optical modulators connected in a serial two staged manner so as to transmit a high-speed optical signal such as in an RZ data format.

Figure 10:
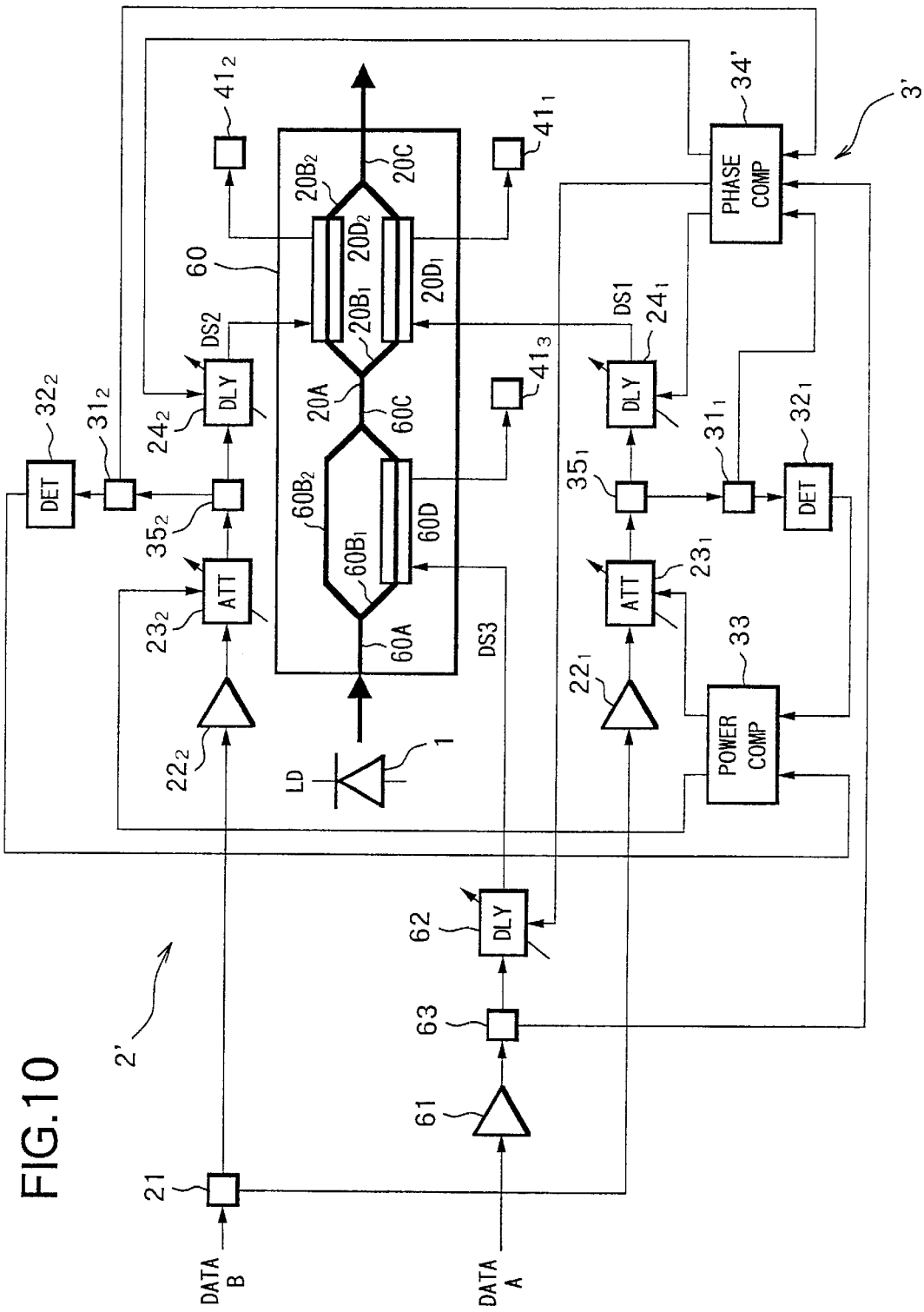
FIG. 10 is a block diagram showing an essential constitution of an optical transmitter according to a modified example of the fourth embodiment.

The fourth embodiment described above has been constituted to control the chirp by monitoring the first through third drive signals DS1, DS2, DS3 having passed through the electrodes $20D_1$, $20D_2$, 60D of the Mach-Zehnder type optical modulator 2', respectively. However, it is also possible to control the chirp by monitoring the first through third drive signals DS1, DS2, DS3 before input into the electrodes $20D_1$, $20D_2$, 60D, respectively, similarly to the situation described in the modified example of the first embodiment. FIG. 10 shows a block diagram showing an essential constitution in such a situation. In this situation, a branch circuit 63 for extracting the third drive signal DS3 is provided between the driving circuit 61 and the variable delay circuit 62, and the bifurcated third drive signal DS3 is transmitted to the phase comparison circuit 34'. Connected to an output terminal of the electrode 60D is a terminator $41_3$.

There will be now described a fifth embodiment of the present invention.

In the fifth embodiment, there will be considered a situation where the present invention is applied to an optical transmitter utilizing an external modulator made up by serially connecting a Mach-Zehnder type optical modulator and an optical phase modulator.

Figure 11:
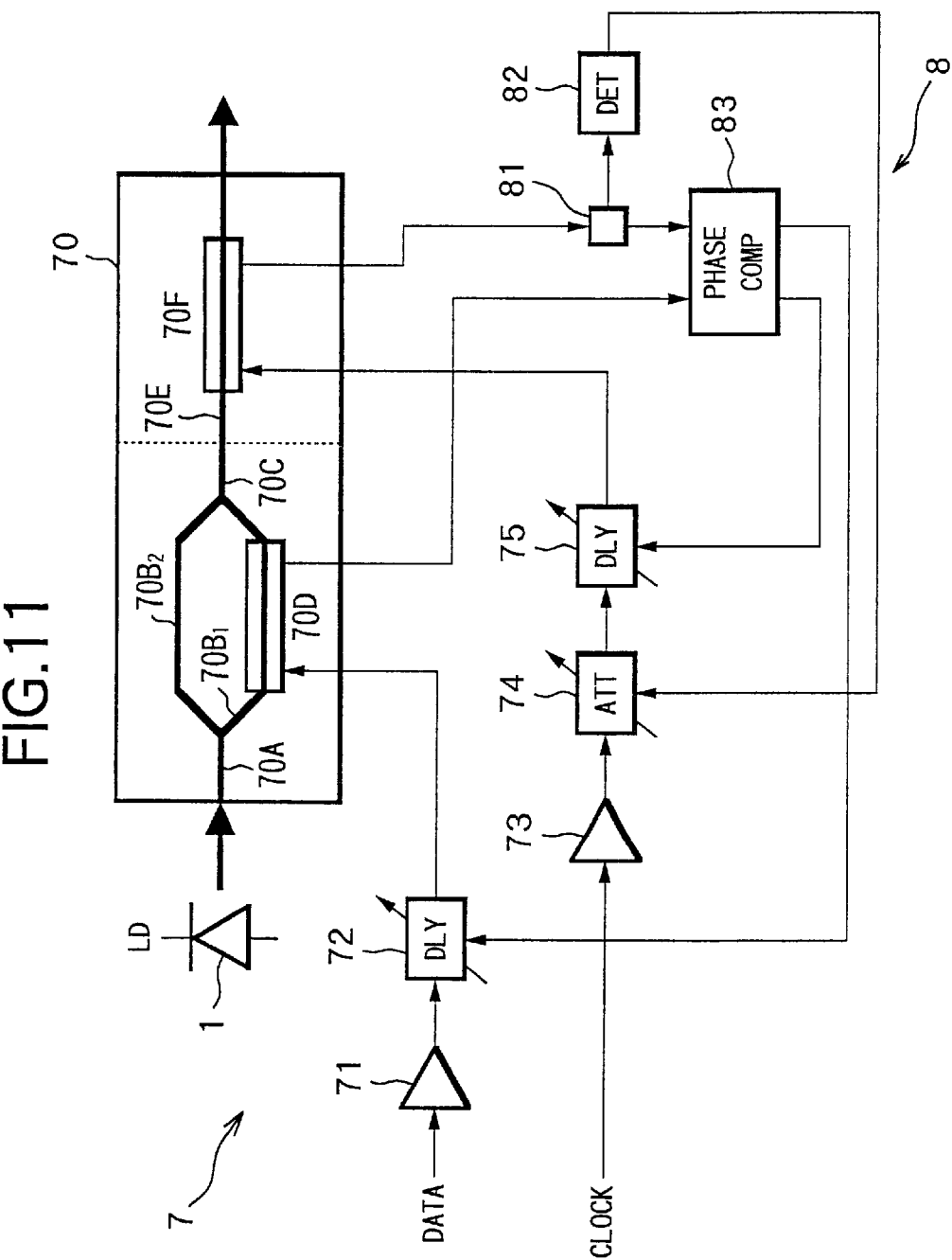
FIG. 11 is a block diagram showing an essential constitution according to a fifth embodiment of the present invention.

FIG. 11 is a block diagram showing an essential constitution according to the fifth embodiment of the present invention.

In FIG. 11, this optical transmitter comprises: a light source (LD) 1; an external modulator 7 for modulating light from the light source 1 by a Mach-Zehnder type optical modulator and an optical phase modulator serially connected to each other; and a chirp controlling circuit 8 for controlling a chirp to be added to the optical signal modulated by the external modulator 7.

The external modulator 7 includes, for example, a substrate part 70, driving circuits 71, 73, variable delay circuits (DLY) 72, 75, and a variable attenuator (ATT) 74.

The substrate part 70 conducts an intensity modulation by the Mach-Zehnder type optical modulator arranged at the preceding stage side, and a phase modulation by the optical phase modulator arranged at the latter stage side, to thereby add a chirp to the optical signal. These Mach-Zehnder type optical modulator and optical phase modulator are formed on a single LN substrate. Further, the light, kept in a polarized state such that the modulation efficiency is maximized, is input into one end of the Mach-Zehnder type optical modulator from the light source 1.

Concretely, in the Mach-Zehnder type optical modulator, CW light from the light source 1 is input into a light input end 70A. This CW light is then bifurcated to be propagated through a first arm $70B_1$, and a second arm $70B_2$, respectively, and thereafter multiplexed into a resultant light which is output from a light output end 70C to the optical phase modulator at the latter stage side. Formed on the first arm $70B_1$ is an electrode 70D to which a drive signal DSa as described later is applied from the light input end 70A side.

In the optical phase modulator at the latter stage side, the optical signal from the light output end 70C at the preceding stage side is input into an optical waveguide 70E, and this optical waveguide 70E is formed with an electrode 70F at a predetermined portion thereof. This electrode 70F is applied with a drive signal DSb to be described later from a light input side.

The drive signal DSa for driving the Mach-Zehnder type optical modulator of the substrate part 70 is generated at the driving circuit 71 and variable delay circuit 72. The driving circuit 71 generates a signal as an origin of the drive signal DSa such as by amplifying a data signal (DATA) at a required bit rate to a predetermined level, and outputs the signal to the variable delay circuit 72. This variable delay circuit 72 is to delay the signal output from the driving circuit 71 to thereby adjust a phase of the signal. A delay amount of this variable delay circuit 72 is controlled in accordance with a control signal output from a phase comparison circuit 83 to be described later.

The drive signal DSb for driving the optical phase modulator of the substrate part 70 is generated by: the driving circuit 73; the variable attenuator 74 as an amplitude adjusting part; and the variable delay circuit 75 as a phase adjusting part. The driving circuit 73 generates a signal as an origin of the drive signal DSb such as by amplifying a clock signal (CLOCK) corresponding to the data signal used in the intensity modulation at the preceding stage side to a predetermined level, and outputs the signal to the variable attenuator 74. The variable attenuator 74 is to attenuate the signal output from the driving circuit 73 so that the amplitude of this signal becomes a value corresponding to a required chirp amount, and this attenuation amount is controlled in accordance with the detection result of an electric power detector 82. The variable delay circuit 75 is to delay the signal output from the variable attenuator 74 to thereby adjust a phase of the signal. A delay amount of this variable delay circuit 75 is controlled in accordance with a signal output from a phase comparison circuit 83.

The chirp controlling circuit 8 includes, for example, a branch circuit 81, the electric power detector (DET) 82 and the phase comparison circuit (PHASE COMP) 83. Here, the electric power detector 82 corresponds to an amplitude controlling part, and the phase comparison circuit 83 corresponds to a phase controlling part.

The branch circuit 81 bifurcates the drive signal DSb having passed through the electrode 70F of the substrate part 70, and sends the bifurcated signals to the electric power detector 82 and phase comparison circuit 83, respectively. The electric power detector 82 detects electric power of the drive signal DSb bifurcated by the branch circuit 81, and notify the result to the variable attenuator 74. The phase comparison circuit 83 compares the phase of the drive signal DSb branched from the branch circuit 81 with the phase of the drive signal DSa having passed through the electrode 70D of the substrate part 70, and generates control signals for feedback controlling the delay amounts of the variable delay circuits 72, 75 so that the timing, at which the drive signal DSb becomes the maximum or the minimum, coincides with a transitional point of the data or with a substantial center of 1 unit data length of the drive signal DSa.

In the optical transmitter having the aforementioned constitution, the CW light generated by the light source 1 is intensity modulated in the Mach-Zehnder type optical modulator at the preceding stage side of the external modulator 7, according to the drive signal DSa. Further, the intensity modulated optical signal is phase modulated in the optical phase modulator at the latter stage side according to the drive signal DSb, so that the chirp is added to the optical signal. At this time, the chirp amount to be added to the optical signal is varied according to the amplitude of the drive signal DSb. Thus, the attenuation amount of the variable attenuator 74 is feedback controlled making use of the detection result of the electric power detector 82, so that the amplitude of the signal output from the variable attenuator 74 becomes a value corresponding to the optimum value of the chirp amount to be set according to: the power of the optical signal to be transmitted; and the wavelength dispersion of the transmission path. Further, since the phase of the amplitude-adjusted drive signal DSb is required to be matched with the phase of the drive signal DSa at the preceding stage side, there is conducted a phase adjustment by controlling the delay amounts of the variable delay circuits 72, 75 by the control signals generated by the phase comparison circuit 83. In this way, the optical signal, which has been intensity modulated at the preceding stage side, is added with the optimum chirp at the latter stage side.

According to the fifth embodiment as described above, it becomes possible to realize an optical transmitter capable of readily adjusting the optimum chirp amount also in a constitution adopting an external modulator made up by serially connecting a Mach-Zehnder type optical modulator with an optical phase modulator, by conducting a feedback control so that the amplitude of the drive signal DSb of the optical phase modulator becomes a value corresponding to the optimum value of the chirp amount, and the phase of the drive signal DSb is matched with the phase of the drive signal DSa of the Mach-Zehnder type optical modulator.

As an applied example of the fifth embodiment, it is possible to adopt a polarization scrambler instead of an optical phase modulator. Polarization scramblers have a function to change a phase difference between two polarization components of light to thereby change a polarized state, and are identical with a Mach-Zehnder type optical modulator and an optical phase modulator, for example, in that a wavelength change is essentially caused. Concretely, such as by entering light into an optical phase modulator made of LN while tilting the plane of polarization of the light relative to an optical axis of the optical phase modulator by 45°, it is possible to change a phase difference between two polarization components of the incident light by a birefringence of LN. By adopting such a polarization scrambler, it becomes possible to reduce the correlation of polarizations between channels, and to readily conduct the adjustment of the optimum chirp amount by applying the present invention similarly to the fifth embodiment.

There will be described an optical transmission system according to the present invention.

Figure 12:
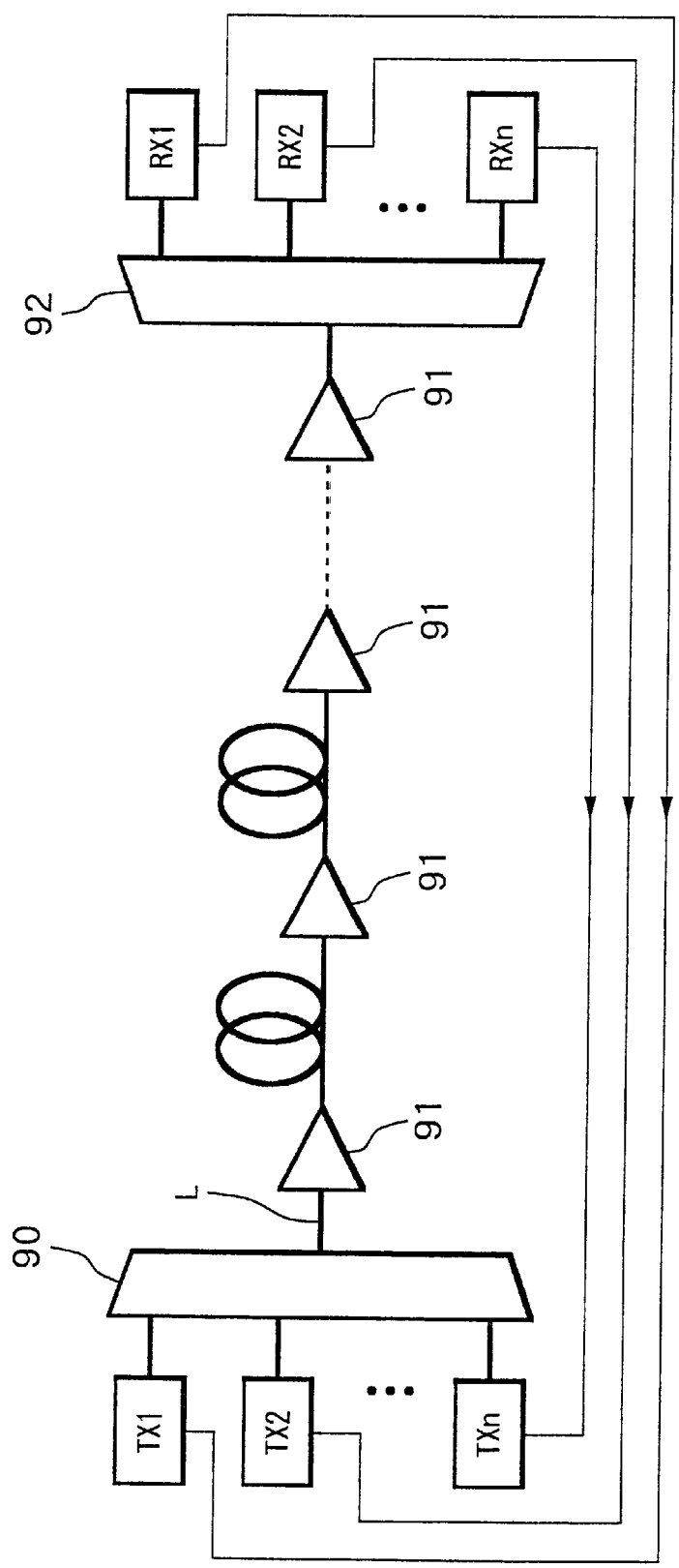
FIG. 12 is a block diagram showing a constitution of an embodiment of an optical transmission system according to the present invention.

FIG. 12 is a block diagram showing a constitution of an optical transmission system according to an embodiment of the present invention.

In FIG. 12, the present optical transmission system comprises: n units of optical transmitters TX1, TX2, . . . TXn for transmitting optical signals of different wavelengths, respectively; an optical multiplexer 90 for wavelength multiplexing the optical signals output from the optical transmitters TX1 to TXn and for transmitting the wavelength multiplexed optical signal to a transmission path L; optical repeaters 91 inserted in the transmission path L at predetermined intervals; an optical demultiplexer 92 for demultiplexing the optical signal repeatedly transmitted via the transmission path L and optical repeater 91, into optical signals of respective wavelengths; and n units of optical receivers RX1, RX2, . . . RXn for receiving and processing the optical signals of respective wavelengths demultiplexed by the optical demultiplexer 92.

Each of the optical transmitters TX1 to TXn is applied with anyone of the optical transmitters shown in the aforementioned first through fifth embodiments, and generates an optical signal added with a chirp of a required amount set according to such as the wavelength dispersion of the transmission path L. Here, the setting of the chirp amount in each of the optical transmitters TX1 to TXn is adjusted corresponding to the receipt information from the associated one of the optical receivers RX1 to RXn.

Each of the optical receivers RX1 to RXn receives the demultiplexed optical signal of the associated wavelength from the optical demultiplexer 92, and conducts a receive processing such as data reproduction. Here, there is monitored information concerning a coding error rate when correcting a coding error by an error-correcting code processing in each of optical receivers RX1 to RXn, and the coding error rate is transmitted as receipt information to the associated one of the optical transmitters TX1 to TXn.

Note, the optical multiplexer 90, optical repeaters 91 and optical demultiplexer 92 are the same with those used in a typical optical transmission system.

Figure 13:
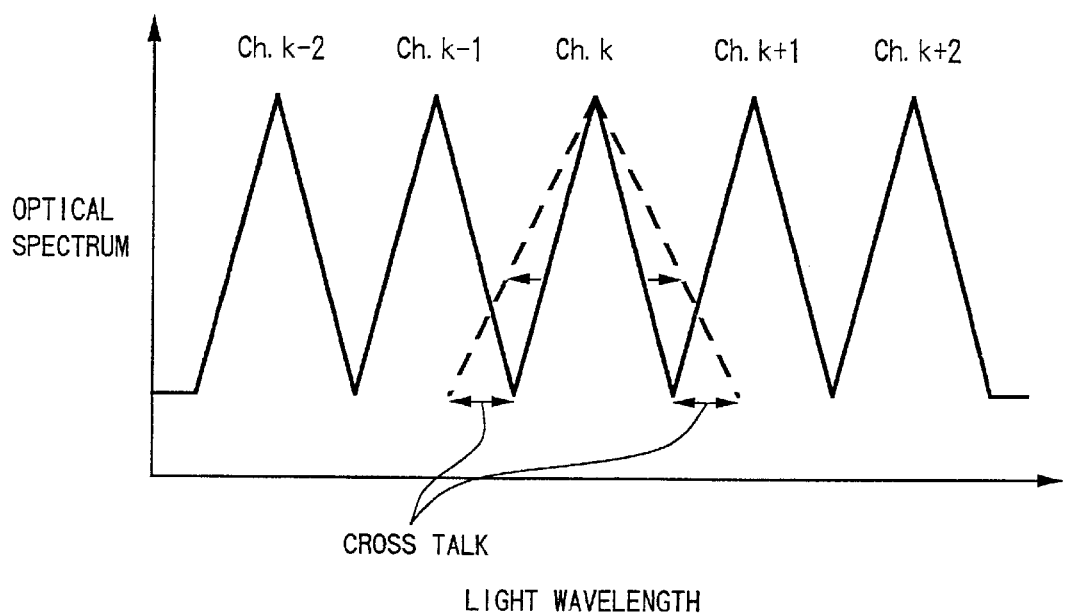
FIG. 13 is a graph for explaining an influence on adjacent channels, accompanying to an increase in a chirp amount, in the embodiment of the optical transmission system.

In the optical transmission system having the aforementioned constitution, the chirp amount to be added to the optical signal is adjusted to the optimum value at each of the optical transmitters TX1 to TXn, identically with the first through fifth embodiments. At this time, when a chirp amount to be added to an optical signal of a certain wavelength (supposed to be a channel k [Ch.kI] is so increased as shown in FIG. 13, the post-transmission spectrum of the optical signal received by the associated optical receiver spreads in a manner as indicated by a broken line in FIG. 13, resulting in cross talk to neighboring channels, to cause a possibility of degradation of transmission qualities of the neighboring channels. As such, in this embodiment, there is conducted the control of the chirp amount so as not to degrade the coding error rates of the neighboring channels, by monitoring the coding error rate of each of the optical receivers RX1 to RXn, and by adjusting the optimum chirp amount of the pertinent channel while considering an affection on the neighboring channels.

Concretely, in controlling a chirp amount for a channel k, the chirp amount is adjusted by firstly using a coding error rate sent from the associated optical receiver for the channel k, and by setting an amplitude ratio of the drive signal, for example, so that the coding error rate is minimized. Next, by using the coding error rates sent from the optical receiver for the channel k−1 and the optical receiver for the channel k+1 corresponding to both neighboring channels, respectively, the chirp amount at the optical transmitter for the channel k is finely adjusted so that the respective coding error rates are decreased. By sequentially conducting such a chirp-amount control for respective channels, there is conducted optimization of a chirp amount taking account of an influence on neighboring channels.

Note, it is difficult to conduct a chirp-amount control using a coding error rate as described above, when an S/N ratio of an optical transmission system is in such an excellent state that no coding errors are caused in an optical receiver. Even in such a situation, it is also possible to conduct a chirp-amount control, such as by changing the setting of pre-emphasis to be conducted at the transmitting side to thereby intentionally degrade the S/N ratio to such an extent that the S/N ratio can be corrected by an error-correcting code processing.

According to the present optical transmission system as mentioned above, it becomes possible to realize an optical transmission system capable of readily obtaining an excellent transmission characteristic, by utilizing an optical transmitter capable of readily conducting an adjustment of the optimum chirp amount, and by conducting optimization of the chirp amount while taking account of an influence on neighboring channels by using receipt information such as a coding error rate obtained by an optical receiver.

In the aforementioned embodiment, there has been considered a coding error rate as the receipt information to be obtained at each optical receiver. However, the receipt information to be used in the present invention is not limited thereto, and it is possible to utilize various information representing receipt characteristics. Further, although there has been exemplified a constitution in which optical repeaters are arranged in the transmission path L, the present invention may be applied to a system requiring no optical repeaters.

What is claimed:

1. An optical transmitter utilizing a Mach-Zehnder type optical modulator, said Mach-Zehnder type optical modulator including: a light input end for receiving light; a first arm and a second arm for branching the light from said light input end to propagate the branched light, respectively; a light output end for synthesizing the branched light propagated through said first and second arms to output the resultant light; a first electrode for applying a first drive signal to the first arm to thereby drive the first arm; and a second electrode for applying a second drive signal to the second arm to thereby drive the second arm, comprising:

amplitude adjusting parts for adjusting the respective amplitudes of the first and second drive signals;

phase adjusting parts for adjusting the respective phases of the first and second drive signals;

an amplitude controlling part for detecting the respective amplitudes of the first and second drive signals, to thereby feedback control the amplitude adjusting parts; and a phase controlling part for detecting the respective phases of the first and second drive signals, to thereby feedback control the phase adjusting parts.

2. An optical transmitter according to claim 1, wherein said amplitude controlling part detects the respective amplitudes of the first and second drive signals after propagated through the first and second electrodes, respectively, and said phase controlling part detects the respective phases of the first and second drive signals after propagated through the first and second electrodes, respectively.

3. An optical transmitter according to claim 1, wherein said amplitude controlling part detects the respective amplitudes of the first and second drive signals before being applied to the first and second electrodes, respectively, and said phase controlling part detects the respective phases of the first and second drive signals before being applied to the first and second electrodes, respectively.

4. An optical transmitter according to claim 1, wherein when said optical transmitter comprises:

low frequency signal superimposing parts, each of which superimposes a predetermined low frequency signal symmetrically on a "1" side and a "0" side of each of the first and second drive signals; and a drift controlling part for detecting a low frequency signal component included in the optical signal output from the Mach-Zehnder type optical modulator to thereby judge an occurring state of an operating point drift, and for controlling the operating point of the Mach-Zehnder type optical modulator so that the operating point drift is compensated for, the amplitudes of the low frequency signals superimposed on the first and second drive signals, respectively, are varied corresponding to an amplitude ratio corresponding to an optical wavelength chirp amount.

5. An optical transmitter according to claim 1, wherein when said optical transmitter comprises:

low frequency signal superimposing parts, each of which superimposes a predetermined low frequency signal on either one of a "1" side and a "0" side of each of the first and second drive signals; and a drift controlling part for detecting a low frequency signal component included in the optical signal output from the Mach-Zehnder type optical modulator to thereby judge an occurring state of an operating point drift, and for controlling the operating point of the Mach-Zehnder type optical modulator so that the operating point drift is compensated for, the amplitudes of the low frequency signals superimposed on the first and second drive signals, respectively, are kept constant independently of an amplitude ratio corresponding to an optical wavelength chirp amount.

6. An optical transmitter according to claim 1, wherein said Mach-Zehnder type optical modulator includes a light modulating part, which is connected serially to a preceding stage of said light input end or a latter stage of said light output end, so as to modulate the light input into the optical transmitter in a two staged manner.

7. An optical transmitter utilizing an external modulator made up by serially connecting a Mach-Zehnder type optical modulator and an optical phase modulator, comprising:

an amplitude adjusting part for adjusting an amplitude of a drive signal for driving said optical phase modulator;

a phase adjusting part for adjusting a phase of said drive signal;

an amplitude controlling part for detecting the amplitude of said drive signal and for feedback controlling said amplitude adjusting part so that said amplitude of the drive signal becomes a value corresponding to an optical wavelength chirp amount set to reduce transmittal degradation of an optical signal; and a phase controlling part for detecting the phase of said drive signal and for feedback controlling said phase adjusting part so that said phase is matched with a phase of a signal for driving the Mach-Zehnder type optical modulator.

8. An optical transmitter according to claim 7, wherein said external modulator uses a polarization scrambler instead of the optical phase modulator.

9. An optical transmission system comprising: a plurality of optical transmitters for transmitting optical signals of different wavelengths, an optical multiplexer for multiplexing the optical signals from said optical transmitters to transmit the multiplexed optical signal to a transmission path; and an optical demultiplexer for demultiplexing the optical signal transmitted through said transmission path into optical signals of respective wavelengths; and a plurality of optical receivers for receiving and processing the optical signals of respective wavelengths demultiplexed by said optical demultiplexer, wherein the optical transmitter according to claim 1 is adopted as each of said plurality of optical transmitters, and in each of said plurality of optical transmitters, the setting of the optical wavelength chirp amount is adjusted based on receipt information transmitted from each of the optical receivers corresponding to the applicable wavelength of the applicable optical transmitter and corresponding to the wavelengths adjacent to the applicable wavelength.

* * * * *